US011418783B2

(12) United States Patent
Gao et al.

(10) Patent No.: US 11,418,783 B2
(45) Date of Patent: Aug. 16, 2022

(54) ENCODING METHOD, DECODING METHOD, ENCODER, AND DECODER

(71) Applicant: HUAWEI TECHNOLOGIES CO., LTD., Guangdong (CN)

(72) Inventors: Han Gao, Munich (DE); Yin Zhao, Hangzhou (CN); Semih Esenlik, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/212,777

(22) Filed: Mar. 25, 2021

(65) Prior Publication Data

US 2021/0211666 A1    Jul. 8, 2021

Related U.S. Application Data

(63) Continuation of application No. PCT/CN2018/108096, filed on Sep. 27, 2018.

(51) Int. Cl.
*H04N 19/119*     (2014.01)
*H04N 19/105*     (2014.01)
*H04N 19/132*     (2014.01)
*H04N 19/176*     (2014.01)

(52) U.S. Cl.
CPC ......... *H04N 19/119* (2014.11); *H04N 19/105* (2014.11); *H04N 19/132* (2014.11); *H04N 19/176* (2014.11)

(58) Field of Classification Search
CPC .. H04N 19/119; H04N 19/105; H04N 19/132; H04N 19/176
See application file for complete search history.

(56) References Cited

U.S. PATENT DOCUMENTS

| 2003/0076324 A1 | 4/2003 | Thrasher et al. | |
| 2020/0195924 A1* | 6/2020 | Hsiang | H04N 19/119 |
| 2021/0168409 A1* | 6/2021 | Furht | H04N 19/119 |

FOREIGN PATENT DOCUMENTS

| EP | 2750384 A2 | 7/2014 |
| EP | 3293975 A1 | 3/2018 |
| WO | 2015180670 A1 | 12/2015 |

OTHER PUBLICATIONS

Brass et al., "Versatile Video Coding (Draft 2)," Joint Video Experts Team (JVET) of ITU-T SG 16 WP 3 and ISO/IEC JTC 1/SC 29/WG 11, Document: JVET-K1001-v6, Ljubljana, SI, Jul. 10-18, 2018, 141 pages.

(Continued)

*Primary Examiner* — Hesham K Abouzahra
(74) *Attorney, Agent, or Firm* — Fish & Richardson P.C.

(57) ABSTRACT

This application provides an example method for processing video or image data. The method includes obtaining a non-overlapped region. The method also includes obtaining a transform block (TB) corresponding to a coding block. The method further includes determining whether the TB cross a border of the non-overlapped region or not. The method also includes, if the TB cross a border of the non-overlapped region, splitting the TB to obtain at least two sub-TBs according to the border of the non-overlapped region.

20 Claims, 9 Drawing Sheets

(56) References Cited

OTHER PUBLICATIONS

Chen et al., "Algorithm description for Versatile Video Coding and Test Model 2 (VTM 2)," Joint Video Experts Team (JVET) of ITU-T SG 16 WP 3 and ISO/IEC JTC 1/SC 29/WG 11, Document: JVET-K1002-v1, Ljubljana, SI, Jul. 10-18, 2018, 19 pages.
Hsu et al., "CE1-related: Constraint for binary and ternary partitions," Joint Video Experts Team (JVET) of ITU-T SG 16 WP 3 and ISO/IEC JTC 1/SC 29/WG 11, Document: JVET-K0556-v2, Ljubljana, SI, Jul. 10-18, 2018, 3 pages.
ITU-T H.261 (Mar. 1993), "Line Transmission of Non-Telephone Signals: Video Codec for Audiovisual services at Vp x 64 kbits," Mar. 1993, 29 pages.
ITU-T H.264 (Apr. 2017), "Series H: Audiovisual and Multimedia Systems—Infrastructure of audiovisual services—Coding of moving video: Advanced video coding for generic audiovisual services," Apr. 2017, 812 pages.
Ma et al., "CE1 description: Partitioning," Joint Video Experts Team (JVET) of ITU-T SG 16 WP 3 and ISO/IEC JTC 1/SC 29/WG 11, Document: JVET-K1021-v1, Ljubljana, SI, Jul. 10-18, 2018, 7 pages.
PCT International Search Report and Written Opinion issued in International Application No. PCT/CN2018/108096 dated Jun. 18, 2019, 10 pages.
Liao et al., "CE10: Triangular prediction unit mode (CE10.3.1 and CE10.3.2)," JVET-K0144-v2, Joint Video Exploration Team (JVET) of ITU-T SG 16 WP 3 and ISO/IEC JTC 1/SC 29/WG 11, 11th Meeting: Ljubljana, SI, Jul. 10-18, 2018, 6 pages.
Extended European Search Report in European Application No. 18935533.2, dated Aug. 26, 2021, 9 pages.

\* cited by examiner

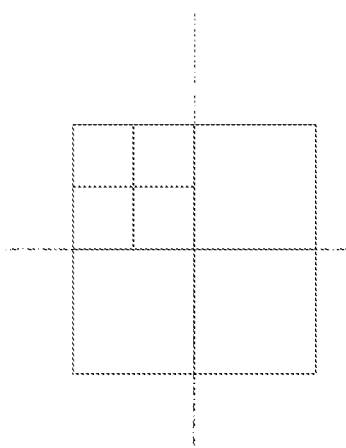
FIG. 6
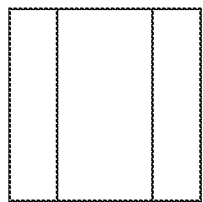
SPLIT_TT_HOR
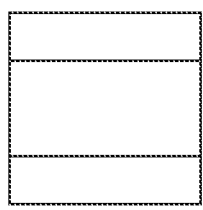
SPLIT_TT_VER
SPLIT_BT_HOR
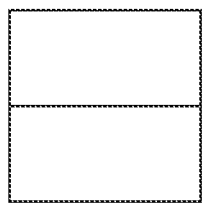
SPLIT_BT_VER
FIG. 7

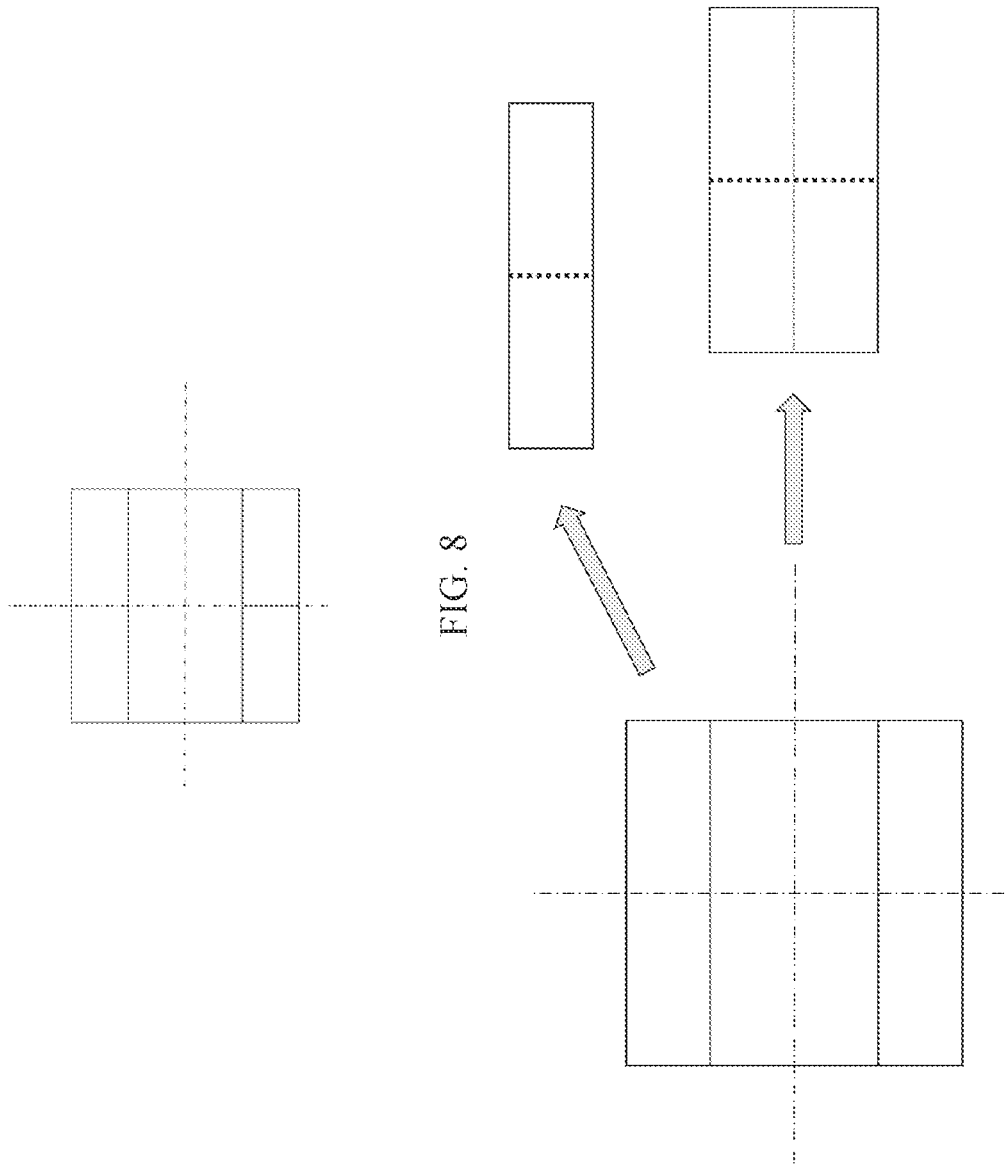

ENCODING METHOD, DECODING METHOD, ENCODER, AND DECODER

CROSS-REFERENCE TO RELATED APPLICATIONS

This application is a continuation of International Application No. PCT/CN2018/108096, filed on Sep. 27, 2018, the disclosure of which is hereby incorporated by reference in its entirety.

TECHNICAL FIELD

The present disclosure relates to the technical field of image and/or video coding and decoding.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types shall be removed, i.e. the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

SUMMARY

Embodiments of the present invention provide an encoding method, a decoding method, an encoding apparatus, a decoding apparatus, a transmitter, a receiver, and a communications system, which can improve articulation of a restored signal, thereby enhancing encoding and decoding performance.

Definitions of Acronyms & Glossary

CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding Video coding schemes such as H.264/AVC and HEVC are designed along the successful principle of block-based hybrid video coding. Using this principle a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (ICT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into C Us by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (C Us), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

In HEVC, the coding tree block size is supported up to 64 by 64 samples in luma. In the hardware implementation, usually one fourth of the samples are required entirely stored in the chip memory in order to process the multiple pipeline stage in the same time, namely for a 64 by 64 luma samples CTU, 32 by 32 luma samples pipeline are required.

HEVC supported the transform block size up to 32 by 32 samples in him. In the meantime, since HEVC only supporting quadtree splitting to recursive partition coding blocks and transform block. The TU is always automate fulfilled in the 32 by 32 regions, which are friendly to hardware implementation.

In FIG. 6, the dash lines are the 32 by 32 non-overlapped grid, which indicates the pipeline region. The solid lines are coding block and transform block partition border. In this example, all transform blocks are located inside of the pipeline region.

In the latest VVC drafts [JVET-K1001], the coding tree block size is supported up to 128 by 128, and the transform block size is supported up to 64 by 64.

In the meantime, for coding tree block or coding block not only the quadtree (QT) splitting are supported, for example, as show in FIG. 7, there is another 2 split modes introduced:

Binary tree (BT) split: splitting the coding tree block or coding block use symmetric binary partition.

Ternary tree (TT) split: splitting the coding tree block or coding block into 3 sub coding block with ¼, ½ and ¼ size in one dimension.

For other examples about BT/TT partition can refers to the proposal ITU, JVET-K1002.

In current VVC design, assuming the coding tree block size is 128×128 in lama samples, maximum transform block size is 64 in luma samples. If there is a coding block larger then maximum transform block size, the block will be implicitly tiled into multiple sub-transform blocks to fulfill the transform block size limitation.

Considering the pipeline region is for example 64×64 (dash line in FIG. 3). If the TT partition mode is applied on the top level of coding tree block (128×128). As shown in the FIG. 8, the middle coding block with size 128×64 is crossing the pipeline region border. Based on the transform block tiling method in current VVC design, this coding block will be implicitly split into 2 sub transform block with size 64 by 64, but the sub-transform block still crossing the pipeline region board. Which means the multiple pipeline stage cannot be processed in the same time.

In the "Description of Core Experiment 1 (CE1): Partitioning" Ljubljana meeting [JVET-K1021] SubCE2 (related to JVET-K0556), limitations of coding block partitioning are introduced.

Virtual pipeline data units (VPDUs) are defined as non-overlapping M×M-luma(L)/N×N-chroma(C) units in a picture for hardware pipeline processing region. In hardware decoders, successive VPDUs are processed by multiple pipeline stages at the same time; different stages process different VPDUs simultaneously. The VPDU size is roughly proportional to the buffer size in most pipeline stages, so it is very important to keep the VPDU size small. In HEVC hardware decoders, the VPDU size is set to maximum transform block (TB) size. Enlarging maximum TB size from 32×32-L/16×16-C (as in HEVC) to 64×64-L/32×32-C (as in the current VVC) can bring coding gains, which results in 4× of VPDU size (64×64-L/32×32-C) expectedly in comparison with HEW. However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which leads to 16× of VPDU size (128×128-L/64×64-C) in comparison with HEVC. To reduce the VPDU size in VVC, one constraint for TT and BT is proposed, and the VPDU size is defined as 64×64-L/32×32-C for the following. These conditions are used to make sure there is no transform block crossing the VPDU.

Condition 1: For each VPDU containing one or multiple CUs, the CUs are completely contained in the VPDU.

Condition 2: For each CU containing one or more VPDUs, the VPDUs are completely contained in the CU.

Proposed constraint: For each CTU, the above two conditions shall not be violated, and the processing order of CUs shall not leave a VPDU and re-visit it later, FIG. 4 shows examples of TT and BT splits that cause problems for 64×64-L/32×32-C pipelining.

Examples in FIG. 4 are disallowed by the above two constraints (Condition 1 and Condition 2). FIG. 5 shows some examples that are allowed.

In the SubCE2 experiments, several coding block splitting limitation is tested to make sure the condition fulfilled mentioned above. The method of limiting coding block splitting will be a coding loss since the flexibility of coding block splitting is reduced.

In the present disclosure, the term image and the term picture has same means.

In one aspect of the present disclosure, a method for processing video or image data is disclosed, the method comprising: obtaining a non-overlapped region (for example, a pipeline region); obtaining a transform block (or transform unit, TU), TB, corresponding to a coding block (or coding unit); determining whether the TB cross a border of the non-overlapped region or not; if the TB cross a border of the non-overlapped region, splitting the TB to obtain at least two sub-TBs according to the border of the non-overlapped region. By using this method, the above problem is resolved without limiting the coding block partition.

In one implementation form of the present application, there are at least two non-overlapped regions.

In an example, the non-overlapped region (for example, a pipeline region) is non-overlapped virtual grid which is suiting for the requirement of the hardware implementation. The shape of the non-overlapped region could be but not limited to square or rectangular. The sizes (width and height) of the non-overlapped region could be but not limited to pre-determined in both the encoder and decoder side; or the sizes (width and height) of the non-overlapped region could be signaled in the bitstream by the encoder and parsed by the decoder. For example, the sizes (width and height) of the non-overlapped region could be signaled in sequence, video, picture parameter sets, or signaled in slice header.

In an example, as showing in FIG. 11, the pipeline regions are pre-defined virtual non-overlapped regions, which are grids starting from the top-left coordinator of the picture. Therefore each regions has its own coordinator corresponding to top-left coordinator of the picture. For example, if the top-left coordinator of the picture is (0,0), then the pipeline region marked as 1 is including the samples in $0<=x<=63$ and $0<=y<=63$, and the pipeline region marked as 2 is including the samples in $64<=x<=127$ and $64<=y<=127$.

In one implementation form of the present application, wherein the shape of the non-overlapped region is a square region. For example, region 2 in FIG. 11.

In one implementation form of the present application, wherein the shape of the non-overlapped region is a triangle region.

In one implementation form of the present application, wherein the shape of the non-overlapped region is a rectangular region.

In one implementation form of the present application, wherein a size of the non-overlapped region is a pre-determined value. The sizes (width and height) of the non-overlapped region could be but not limited to pre-determined in both the encoder or decoder side; or the sizes (width and height, the unit is pixels or samples) of the non-overlapped region could be but not limited to pre-stored in both encoder or decoder side. In an example, a pre-determined value of the size of the non-overlapped region is 64×64 or 32×32 or 64×32 or 32×64, etc.

In one implementation form of the present application, wherein a size of the non-overlapped region is determined by an encoder; or a size of the non-overlapped region is obtained by parsing a bitstream by a decoder. The sizes (width and height) of the non-overlapped region could be signaled in the bitstream by the encoder and parsed by the decoder. For example, the sizes (width and height) of the non-overlapped region could be signaled in sequence, video, picture parameter sets, or signaled in slice header.

In one implementation form of the present application, wherein the obtaining a non-overlapped region, comprises: obtaining at least two non-overlapped regions; wherein the determining whether the TB cross a border of the non-overlapped region or not, comprises: determining whether a region of the TB contains parts of at least two non-overlapped regions, if the region of the TB contains parts of at least two non-overlapped regions, the TB cross the border of the non-overlapped region.

In one implementation form of the present application, wherein the determining whether the TB cross a border of the non-overlapped region or not, comprises: determining whether a coordinator corresponding to a corner sample (for example, top-left) of the TB and a coordinator corresponding to another corner (different with the top left, for example, the another corner may be top-right, bottom-right, or bottom-left) sample of the TB are located in a same non-overlapped region (for example, there may be more than one non-overlapped region); if the coordinator corresponding to the corner of the TB and the coordinator corresponding to the another corner of the TB are not located in the non-overlapped region, the TB cross the border of the non-overlapped region.

In an example, it may use coordinators corresponding to three corner samples of the TB to determine whether the TB cross a border of the non-overlapped region or not. For example, coordinators corresponding to top-left, bottom-left, top-right samples of the TB are used, and it may determine whether coordinators corresponding to two corner samples in the three corner samples are located in a same non-overlapped region or not. For example, if top-left and bottom-left samples are determined located in a same non-overlapped region, then determine whether the top-left and the top-right samples are located in a same non-overlapped region.

In one implementation form of the present application, wherein the determining whether the TB cross a border of the non-overlapped region or not, comprises: determining whether all coordinators corresponding to the corner samples of the TB are located in the same non-overlapped region; if the all coordinators corresponding to the corner sample of the TB are not located in a same non-overlapped region, the TB cross the border or borders of the non-overlapped region.

In an example, as shown in FIG. 11, the pipeline regions are pre-defined virtual non-overlapped regions, which are grids starting from the top-left coordinator of the picture. Therefore each regions has its own coordinator corresponding to top-left coordinator of the picture. For example, if the top-left coordinator of the picture is (0,0), then the pipeline region marked as 1 is including the samples in $0<=x<=63$ and $0<=y<=63$, and the pipeline region marked as 2 is including the samples in $64<=x<=127$ and $64<=y<=127$.

One example in this embodiment is to check whether the coordinators of the top-left samples and the right bottom samples of the transform block are located in the same pipeline region. If true, then the transform block is not crossing the pipeline region boarder, otherwise the transform block is crossing the pipeline region boader. For example, if the there is a transform block with the top-left located at (0,0) and with size 64×64, which means the right-bottom sample are located at (63,63), this transform block is entirely located inside of the pipeline region marked as 1 in FIG. 13, which mean this transform block is not crossing the pipeline region boader. If the there is a transform block with the top-left located at (0,32) and with width=128 and height=64, which means the right-bottom sample are located at (127, 95), the top-left sample is located in the pipeline region mark as 1 while the right-bottom sample is located in the pipeline region marked as 2 in FIG. 13, which mean this transform block is crossing the pipeline region boader.

In this embodiment, by using the proposed method, without limiting the coding block partition.

In one implementation form of the present application, wherein each sub-TB of the at least two sub-TBs only corresponding to part of one non-overlapped region.

In one implementation form of the present application, wherein a border of a sub-TB is part of the border of non-overlapped region.

In one implementation form of the present application, wherein the at least two sub-TBs are obtained according to split the TB, and each sub-TB of the at least two sub-TBs cannot be further split.

In one implementation form of the present application, wherein the method further comprises: before determining whether the TB cross a border of the non-overlapped region or not, if the size of the TB is larger than the maximum allowed transform block size, implicit split the transform block into multiple sub transform blocks to obey the maximum allowed transform block size.

In an example, FIG. 9 illustrates a 128×128 CTB split by TT into 3 coding blocks. The first coding block with width 128 luma samples and height 32 lama samples. Because the width of this coding block is larger then the maximum transform block site, the same site transform block is two large for direct transform. This transform block is split by the bolt dolt line into two sub transform blocks with size 32×64 in luma samples. The second coding block with width 128 luma samples and height 64 luma samples. In the first step, similar to first coding block, it will implicit split into two 64×64 in luma sample by bolt dost line transform blocks.

In summary, in one implementation form of the present application, the transform block implicit splitting rules should following:

Rule (1): If the site of a transform block is larger than the maximum allowed transform block size, implicit split the transform block into multiple sub transform blocks to obey the maximum allowed transform block size.

Rule (2): If a transform block is containing (no need to completely containing) more than one pipeline region, the transform block is implicit split into multiple sub transform blocks using the pipeline region border to suit for the hardware implementation requirement.

In another aspect of the present disclosure, an encoder comprising processing circuitry for carrying out the above methods.

In another aspect of the present disclosure, a decoder comprising processing circuitry for carrying out the above methods In another aspect of the present disclosure, a computer program product comprising a program code for performing the above methods.

In another aspect of the present disclosure, a decoder comprises: one or more processors; and a non-transitory computer-readable storage medium coupled to the processors and storing programming for execution by the processors, wherein the programming, when executed by the processors, configures the decoder to carry out the above methods.

In another aspect of the present disclosure, an encoder, comprises: one or more processors; and a non-transitory computer-readable storage medium coupled to the processors and storing programming for execution by the processors, wherein the programming, when executed by the processors, configures the encoder to carry out the above methods.

The problem section is descript that the multi stage pipeline processing cannot be done in the same time since the resulting transform unit is crossing the pipeline processing region border. Although in the prior art, the coding block partition limitation will resolve the problem, hut the method introduced coding loss and inflexible partition mode selection.

In the proposed method, the coding block partition is not restricted for suiting the pipeline region. In case a transform block (which could be same size as coding block, or resulted sub-transform block tiled by maximum transform block size limitation) is crossing the pipeline region border, the transform block is split into multiple sub transform blocks by the pipeline region border implicitly. The implicit splitting process of transform block is performed both in the encoder and decoder side.

The pipeline region is non-overlapped virtual grid which is suiting for the requirement of the hardware implementation. The shape of the pipeline region could be but not limited to square or rectangular. The sizes (width and height) of the pipeline region could be but not limited to pre-determined in both the encoder and decoder side: signaled in the bitstream by the encoder and parsed by the decoder, signaled in sequence, video, picture parameter sets, or signaled in slice header.

In summary, the transform block implicit splitting rules should following:

If the size of a transform block is larger than the maximum allowed transform block size, implicit split the transform block into multiple sill) transform blocks to obey the maximum allowed transform block size (rule (1)).

If a transform block is containing (no need to completely containing) more than one pipeline region, the transform block is implicit split into multiple sub transform blocks using the pipeline region border to suit for the hardware implementation requirement (rule (2)).

In an embodiment, for example,
Assuming:
Coding block size is 128×128 in luma samples
Maximum transform block size is 64×64 in luma samples
Pipeline region size is 64×64 in luma samples
TT is used to split the coding tree block into 3 leaf node coding blocks.

The pipeline regions are pre-defined virtual non-overlapped regions, which are grids starting from the top-left coordinator of the picture. Therefore each regions has its own coordinator corresponding to top-left coordinator of the picture. For example, as shown in FIG. 11, the solid lines indicate picture frame, the dash lines indicate the border of the pipeline regions. If the top-left coordinator of the picture is (0, 0), then the pipeline region marked as 1 is including the samples in $1<=x<=63$ and $0<=y<=63$, and the pipeline region marked as 2 is including the samples in $64<=x<=127$ and $64<=y<=127$.

FIG. 9 illustrates a 128×128 CTB split by TT into 3 coding blocks. The first coding block with width 128 luma samples and height 32 luma samples. Because the width of this coding block is larger than the maximum transform block size, the same size transform block is two large for direct transform. Based on rule (1) this transform block is split by the bolt dot line into two sub transform blocks with size 32×64 in lama samples which are fulfilled the rule (1) and (2).

The second coding block with width 128 luma samples and height 64 luma samples. In the first step, similar to first coding block, it will implicit split into two 64×64 in luma sample by bolt dot line transform blocks which are fulfilled the rule (1). In the second step, the two 64×64 transform blocks are implicit split into four 32×64 transform blocks to fulfill the rule (2).

In rule (2), it's need to check whether a transform block is crossing the pipeline region board. One example in this embodiment is to check whether the coordinators of the top-left samples and the right bottom samples of the transform block are located in the same pipeline region. If true, then the transform block is not crossing the pipeline region border, otherwise the transform block is crossing the pipeline region border. For example, if the there is a transform block with the top-left located at (0,0) and with size 64×64, which means the right-bottom sample are located at (63,63), this transform block is entirely located inside of the pipeline region marked as 1 in FIG. 11, which mean this transform block is not crossing the pipeline region border.

If the there is a transform block with the top-left located at (0, 32) and with width=128 and height=64, which means the right-bottom sample are located at (127, 95), the top-left sample is located in the pipeline region mark as 1 while the right-bottom sample is located in the pipeline region marked as 2 in FIG. 11, which mean this transform block is crossing the pipeline region border.

In this embodiment, by using the proposed method, the above problem is resolved without limiting the coding block partition.

In the embodiment, the rule (2) is performed after rule (1) only in the purpose of demonstration. In this invention, there is no order or dependence of the existing rules (for example rule 1) and the invented rule. In other word, the invented rule can be applied individually.

BRIEF DESCRIPTION OF DRAWINGS

The following embodiments are described in more detail with reference to the attached figures and drawings, in which:

FIG. 6 is a diagram showing pipeline region and partition on coding block and transform block.

FIG. 7 is a diagram showing examples of Binary tree partition and ternary tree partition.

FIG. 8 shows a Top level (coding tree block level) partition.

FIG. 9 is a diagram showing example of splitting of transform blocks.

DESCRIPTION OF THE EMBODIMENTS

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Video coding typically refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

Figure 1:
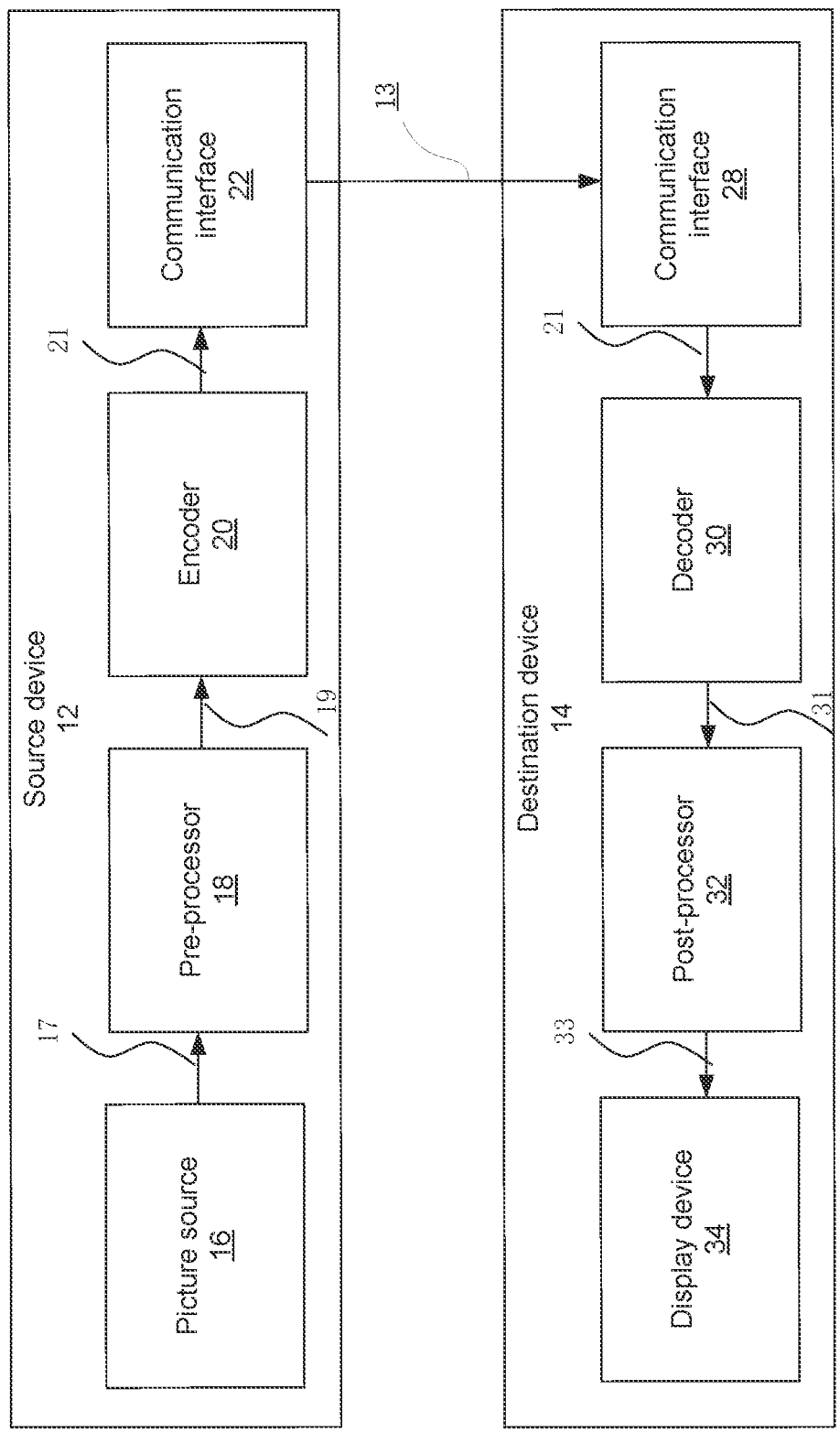
FIG. 1 is a block diagram showing an example of a video coding system configured to implement embodiments of the invention.

FIG. 1 is a conceptual or schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1, the coding system 10 comprises a source device 12 configured to provide encoded data 13. e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. Fax representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, Which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Ch and Cr). Pictures in RGB format may be converted or transformed into YCbCr format and vice versa, the process is also known as color transformation or conversion. If a picture is monochrome, the picture may comprise only a luminance sample array.

The picture source 16 (e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory-, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RUB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to KGB), color correction, trimming, or re-sampling, or any other processing, e.g., for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 2:
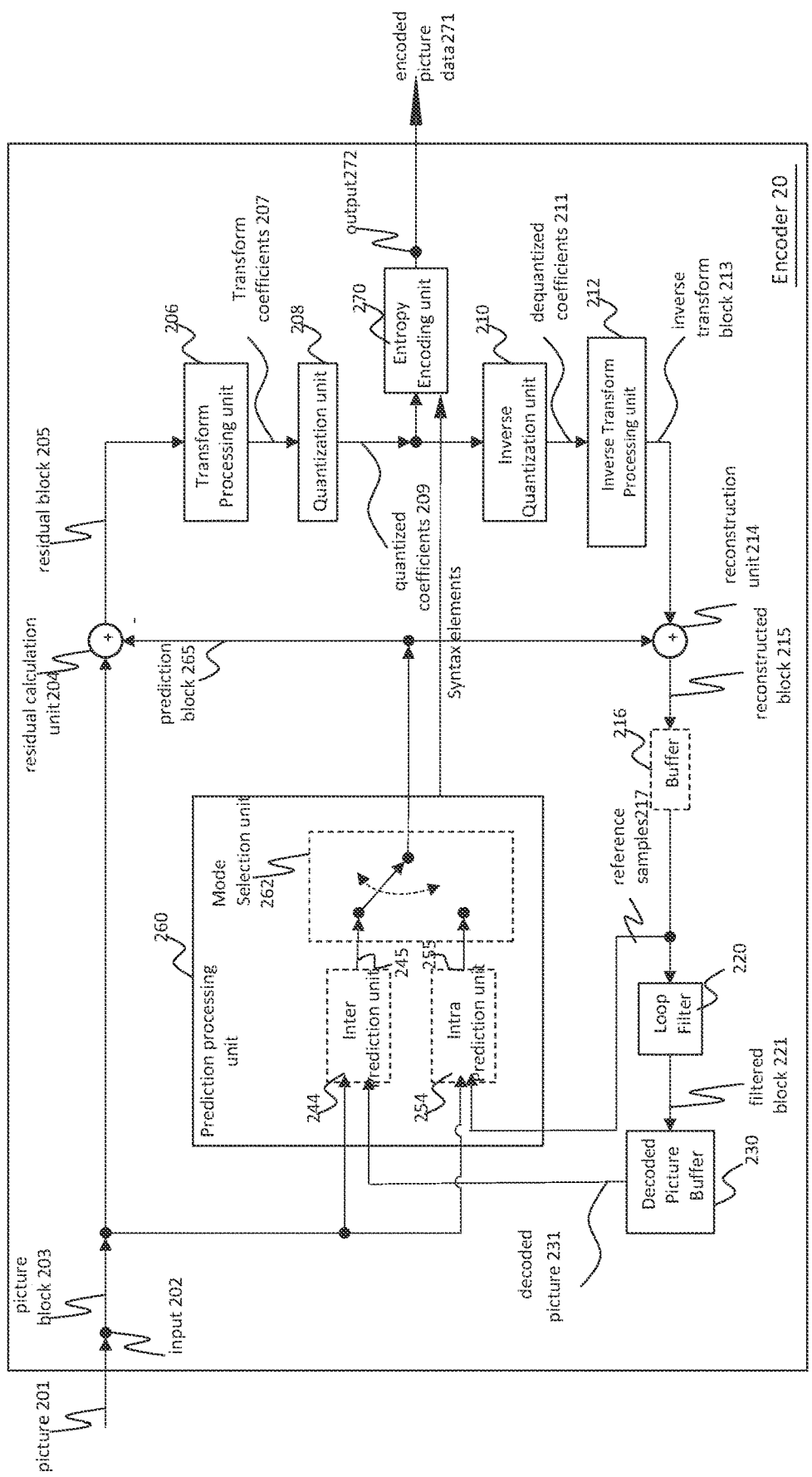
FIG. 2 is a block diagram showing an example of a video encoder configured to implement embodiments of the invention.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
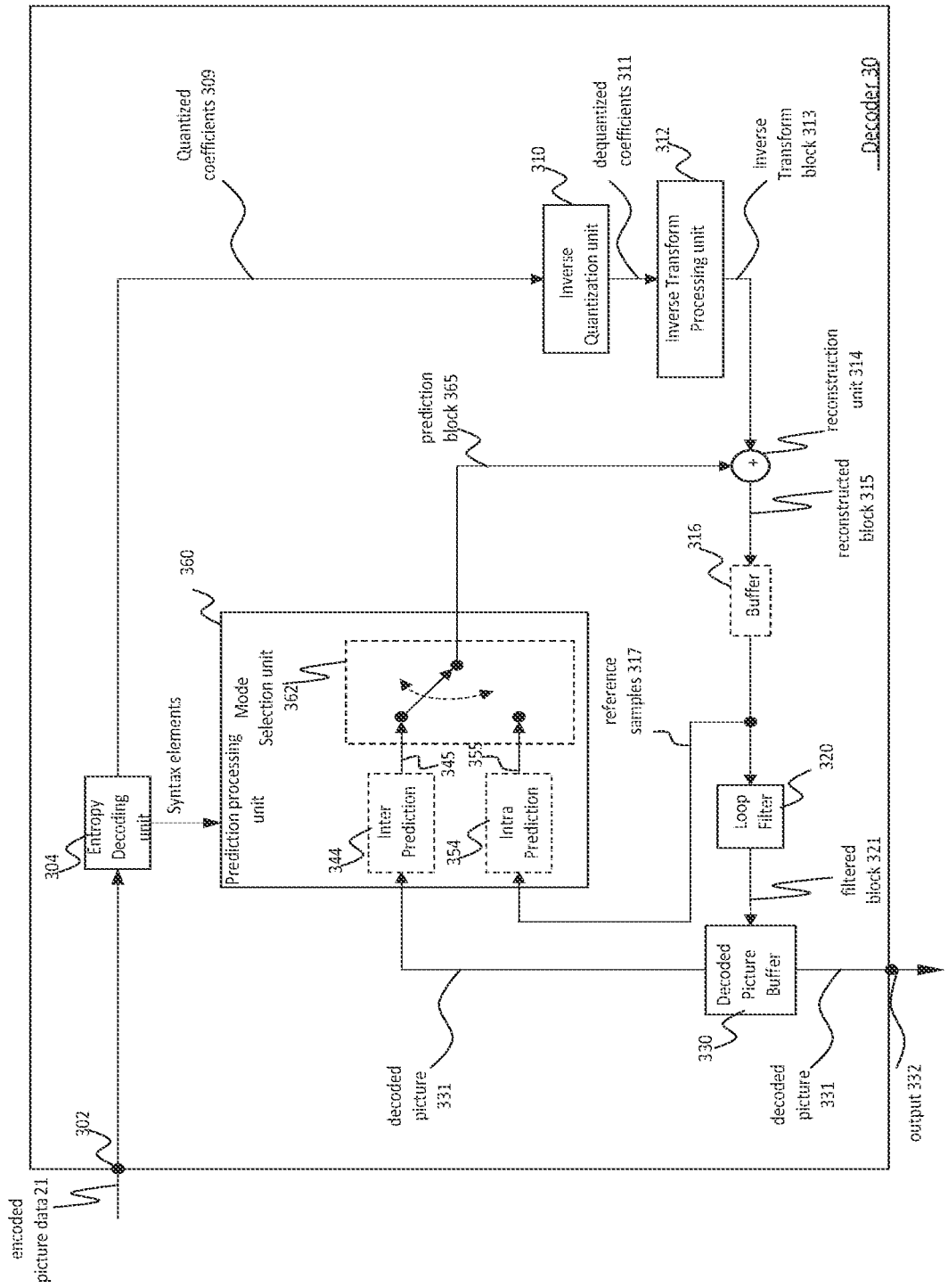
FIG. 3 is a block diagram showing an example structure of a video decoder configured to implement embodiments of the invention.
Figure 4:
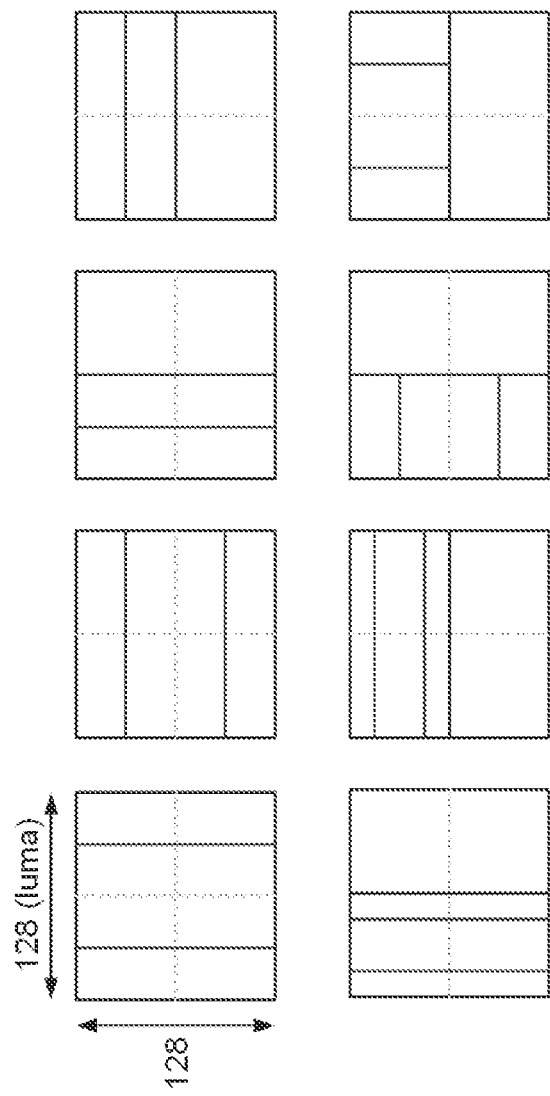
FIG. 4 is a diagram showing examples of TT and BT splits for 64×64-L/32×32-C pipelining (VPDUs indicated by dashed lines).
Figure 5:
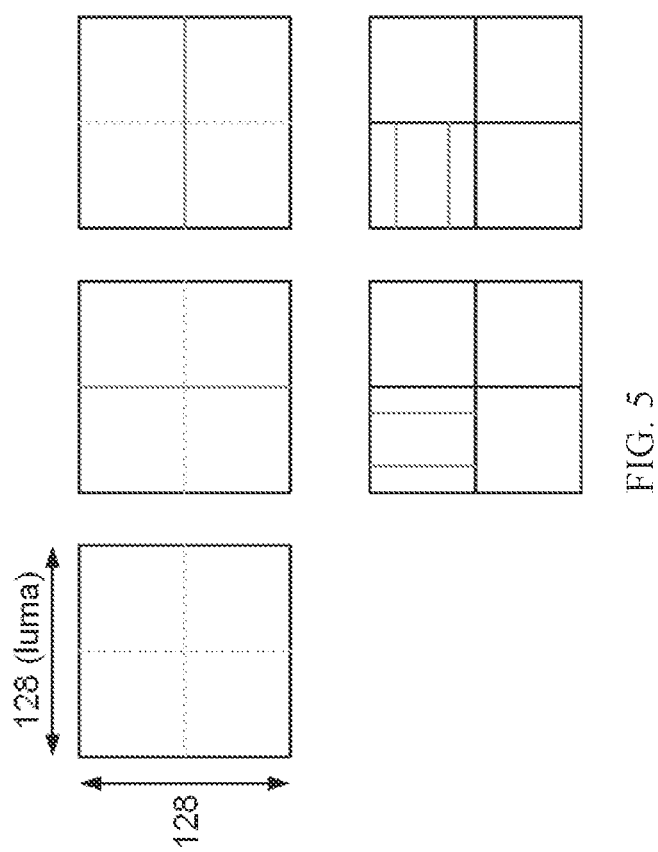
FIG. 5 is a diagram showing examples of allowed TT and BT splits for 64×64-L/32×32-C pipelining (VPDUs indicated by dashed lines).

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120 and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters, Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. Fax example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 10:
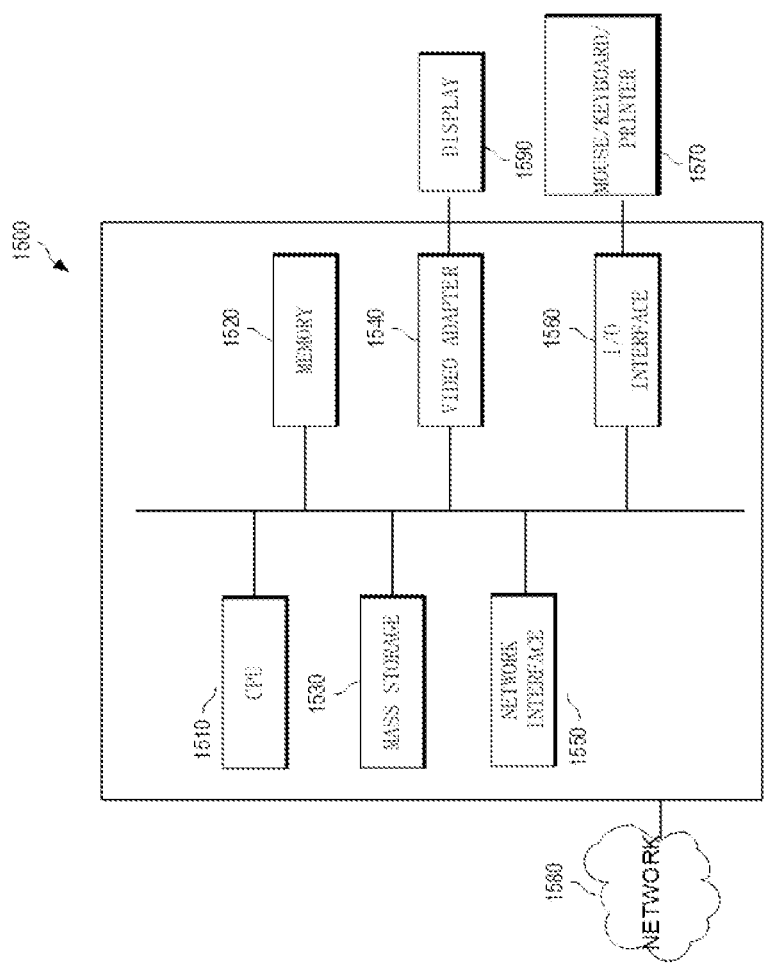
FIG. 10 shows a block diagram of an apparatus.
Figure 11:
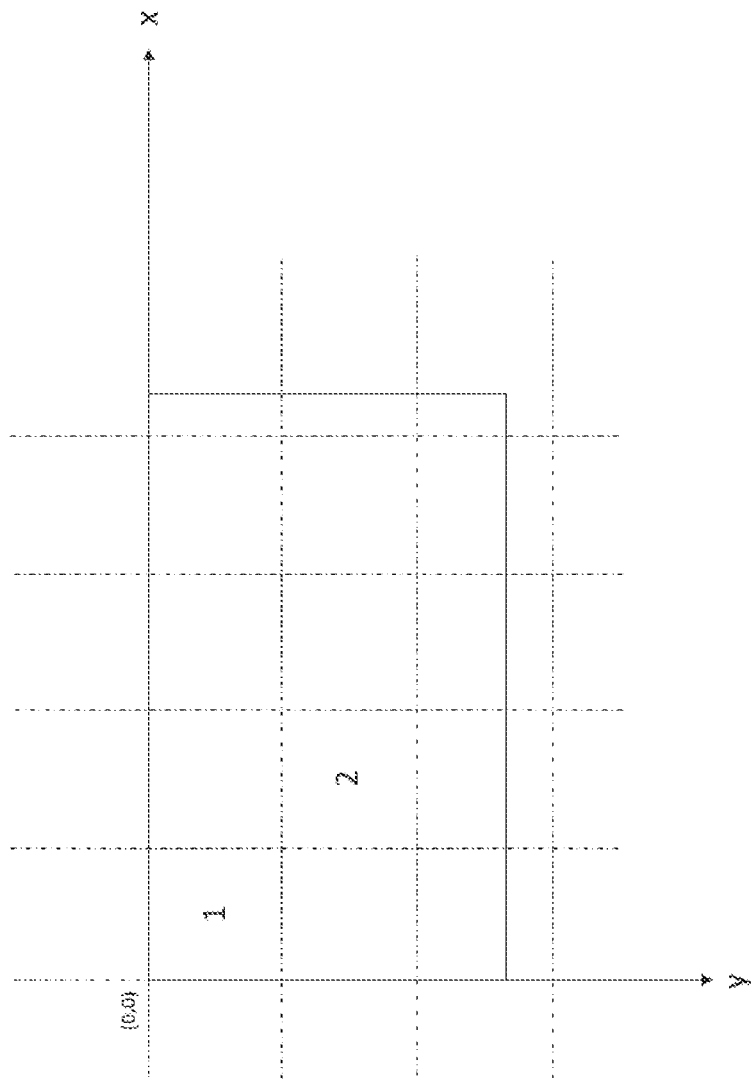
FIG. 11 is a diagram showing examples of pipeline regions.

FIG. 10 is a schematic diagram of a network device 1300 according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

FIG. 10 is a block diagram of an apparatus 1100 that can be used to implement various embodiments. The apparatus 1100 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more input/output devices, such as a speaker, microphone, mouse, touchscreen, keypad, keyboard, printer, display, and the like. The apparatus 1100 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1100. For example, the apparatus 1100 may provide SQL, command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1100, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1100 to communicate with remote units via the networks 1580. For example, the network interface 1550 may provide communication to database. In an embodiment, the apparatus 1100 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation is, on the one hand, significantly reduces the computational complexity of the distance-weighted prediction mechanism as compared with straightforward weighting coefficient calculation and, on the other hand, helps to achieve higher accuracy of weighting coefficient values as compared with prior-art simplifications.

The embodiments may be applied to other bidirectional and position dependent intra-prediction techniques (e.g., different modifications of PDPC) as well as mechanisms that use weighting coefficients that depend on distance from one pixel to another to blend different parts of a picture (e.g., some blending methods in image processing).

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

The foregoing descriptions are merely specific implementation manners of the present invention, hut are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:
1. A method, the method comprising:
obtaining a non-overlapped region;
obtaining a transform block (TB) corresponding to a coding block;
determining whether the TB crosses a border of the non-overlapped region or not; and
in response to the TB crossing a border of the non-overlapped region, splitting the TB to obtain at least two sub-TBs according to the border of the non-overlapped region;
wherein the determining whether the TB crosses a border of the non-overlapped region or not, comprises:
determining whether a coordinator corresponding to a corner sample of the TB and a coordinator corresponding to another corner sample of the TB are located in a same non-overlapped region; and
in response to determining that the coordinator corresponding to the corner sample of the TB and the coordinator corresponding to the another corner sample of the TB are not located in the same non-overlapped region, determining that the TB crosses the border of the non-overlapped region.

2. The method of claim 1, wherein the shape of the non-overlapped region is a square region.

3. The method of claim 1, wherein the shape of the non-overlapped region is a rectangular region.

4. The method of claim 1, wherein the shape of the non-overlapped region is a triangle region.

5. The method of claim 1, wherein a size of the non-overlapped region is a pre-determined value.

6. The method of claim 1, wherein a size of the non-overlapped region is determined by an encoder, or
the size of the non-overlapped region is obtained by parsing a bitstream by a decoder.

7. The method of claim 1, wherein each sub-TB of the at least two sub-TBs only corresponding to part of one non-overlapped region.

8. The method of claim 1, wherein a border of a sub-TB is part of the border of non-overlapped region.

9. The method of claim 1, wherein the at least two sub-TBs are obtained according to split the TB, and each sub-TB of the at least two sub-TBs cannot be further split.

10. A computer program product comprising one or more non-transitory computer-readable storage media encoded with instructions that, when executed by one or more processors, cause the one or more processors to perform operations comprising:
obtaining a non-overlapped region;
obtaining a transform block (TB) corresponding to a coding block;
determining whether the TB crosses a border of the non-overlapped region or not; and
in response to the TB crossing a border of the non-overlapped region, splitting the TB to obtain at least two sub-TBs according to the border of the non-overlapped region;
wherein the determining whether the TB crosses a border of the non-overlapped region or not, comprises:
determining whether a coordinator corresponding to a corner sample of the TB and a coordinator corresponding to another corner sample of the TB are located in a same non-overlapped region; and
in response to determining that the coordinator corresponding to the corner sample of the TB and the coordinator corresponding to the another corner sample of the TB are not located in the same non-overlapped region, determining that the TB crosses the border of the non-overlapped region.

11. The computer program product of claim 10, wherein the shape of the non-overlapped region is a square region.

12. The computer program product of claim 10, wherein the shape of the non-overlapped region is a rectangular region.

13. The computer program product of claim 10, wherein the shape of the non-overlapped region is a triangle region.

14. The computer program product of claim 10, wherein a size of the non-overlapped region is a pre-determined value.

15. A decoder, comprising:
one or more processors; and
one or more memories coupled to the one or more processors and storing programming instructions for execution by the one or more processors to:
obtain a non-overlapped region;
obtain a transform block (TB) corresponding to a coding block;
determine whether the TB crosses a border of the non-overlapped region or not; and
in response to the TB crossing a border of the non-overlapped region, split the TB to obtain at least two sub-TBs according to the border of the non-overlapped region;
wherein the determine whether the TB crosses a border of the non-overlapped region or not, comprises:
determine whether a coordinator corresponding to a corner sample of the TB and a coordinator corresponding to another corner sample of the TB are located in a same non-overlapped region; and
in response to determining that the coordinator corresponding to the corner sample of the TB and the coordinator corresponding to the another corner sample of the TB are not located in the same non-overlapped region, determine that the TB crosses the border of the non-overlapped region.

16. The decoder of claim 15, wherein the shape of the non-overlapped region is a square region.

17. The decoder of claim 15, wherein the shape of the non-overlapped region is a rectangular region.

18. The decoder of claim 15, wherein the shape of the non-overlapped region is a triangle region.

19. The decoder of claim 15, wherein a size of the non-overlapped region is a pre-determined value.

20. The decoder of claim 15, wherein a size of the non-overlapped region is determined by an encoder, or
the size of the non-overlapped region is obtained by parsing a bitstream by a decoder.

* * * * *